E. F. HATHAWAY.
KNOT TYING IMPLEMENT.
APPLICATION FILED JUNE 15, 1915.

1,387,051. Patented Aug. 9, 1921.

Inventor:
Edgar F. Hathaway,
by Emery Booth Janney Varney
Attys.

Witnesses:
Edward W. Baker.
Llewellyn Richards

E. F. HATHAWAY.
KNOT TYING IMPLEMENT.
APPLICATION FILED JUNE 15, 1915.

1,387,051. Patented Aug. 9, 1921.

Witnesses:
Llewellyn Richards.
Edward W Baker.

Inventor:
Edgar F. Hathaway.
by Emery Booth Janney Varney
Attys.

E. F. HATHAWAY.
KNOT TYING IMPLEMENT.
APPLICATION FILED JUNE 15, 1915.

1,387,051. Patented Aug. 9, 1921.
3 SHEETS—SHEET 3.

Witnesses:
Llewellyn Richards.
Edward W. Baker.

Inventor:
Edgar F. Hathaway.
by Emery Booth Janney & Varney
Attys.

UNITED STATES PATENT OFFICE.

EDGAR F. HATHAWAY, OF BOSTON, MASSACHUSETTS, ASSIGNOR, BY MESNE ASSIGNMENTS, TO BARBER-COLMAN COMPANY, OF ROCKFORD, ILLINOIS, A CORPORATION OF ILLINOIS.

KNOT-TYING IMPLEMENT.

1,387,051. Specification of Letters Patent. Patented Aug. 9, 1921.

Application filed June 15, 1915. Serial No. 34,289.

*To all whom it may concern:*

Be it known that I, EDGAR F. HATHAWAY, a citizen of the United States, and a resident of Boston, in the county of Suffolk and State of Massachusetts, have invented an Improvement in Knot-Tying Implements, of which the following description, in connection with the accompanying drawings, is a specification, like characters on the drawings representing like parts.

This invention relates to implements for the automatic tying of knots in thread, yarn or twine, and an important object thereof is to provide a portable implement for such purpose in which the operation of the implement is fully automatic, requiring no action by the operator excepting that of placing the strands to be united across or with relation to the operating member of the implement.

In order that the principle of the invention may be readily understood, I have disclosed a single embodiment thereof in the accompanying drawings, wherein—

Knot tying implements adapted to be secured to the hand of the operator and to be operated digitally or otherwise are well known. These devices are open to the serious objection that both hands of the operator are not wholly free. One of the important objects of my invention is to provide a knot tying implement which may be readily carried or supported upon the person of the operator, and in such manner as to leave both hands of the operator wholly free. Another important object is to provide a self-contained knot tying implement that is provided with motor means for operating the same, said motor means being of any suitable type. Preferably I provide means permitting the functioning of the motor by thread pressure. Other important objects of the invention will be set forth hereinafter.

The structure of the implement and the form and relation of parts thereof may be widely varied within the scope and purpose of my invention. Preferably I provide a casing or inclosure therefor herein represented as composed of two parts 1 and 2, which may be of metal or of any suitable material, and are secured together in any desired manner, as, for example, by means of suitable screws 3 engaging the rim or edge portions of the casing. In operation, the implement is preferably supported in a convenient position on the operator's body at the waist or chest, as by placing the supporting hook 4 over an appropriate belt to be worn on the body or about the neck.

Any suitable knot tying member may be provided, and the character thereof may be varied according to the character of knot that is to be tied, which, for example, may be a round or spinner's knot, or any other suitable character of knot. The movement imparted to the knot tying member may be one of rotation, or of any other suitable character, and my invention is therefore not limited in this respect. I shall proceed to describe the illustrated embodiment only of the invention.

Figure 1:
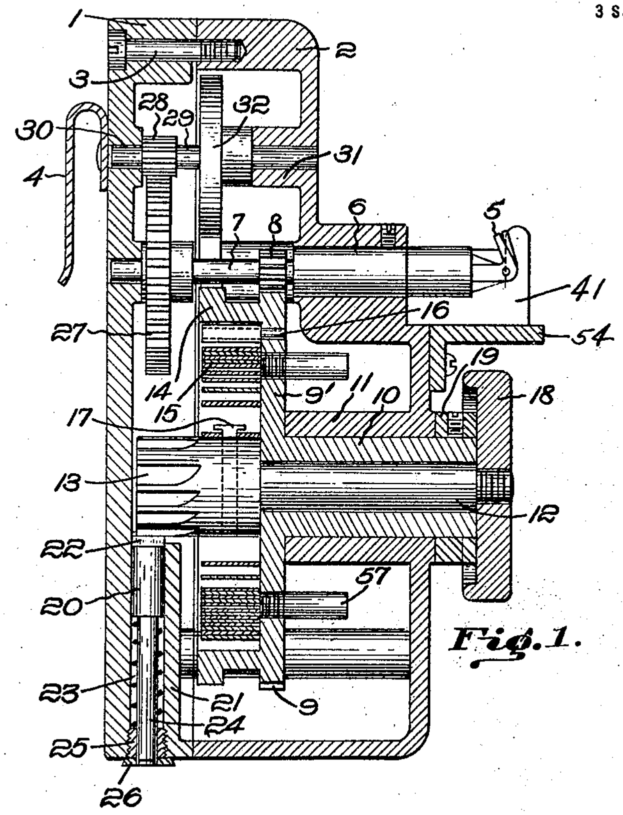
Figure 1 represents a vertical, sectional view upon the line A—B of Figs. 4 and 5.
Figures 4, 5, 6, 10, 11:
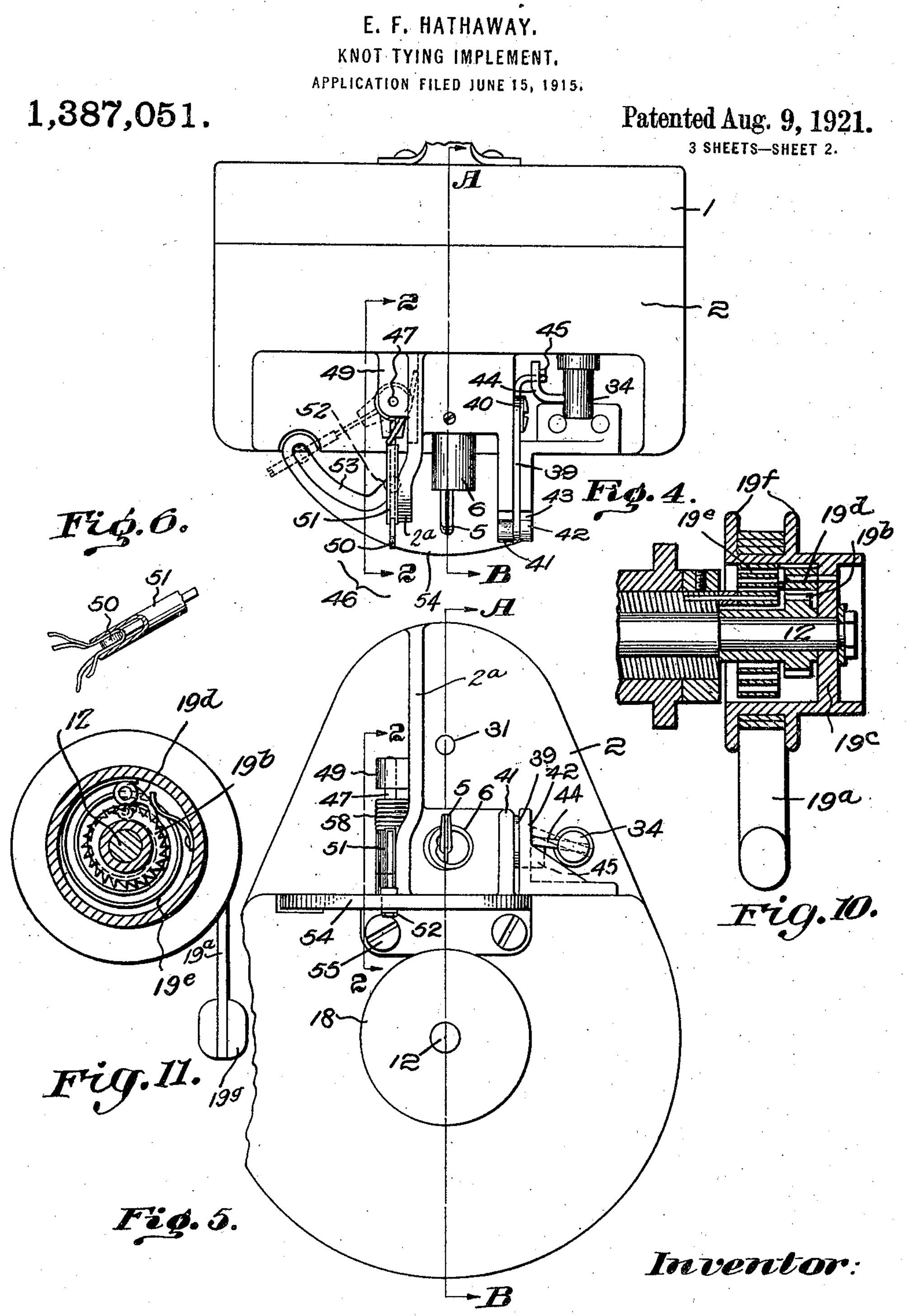
Fig. 4 is a plan view of the implement and showing in dotted lines the holding and stripping mechanism as it is positioned in the act of stripping a knot from the tying bill.
Fig. 5 is a front view of the implement with the parts in assembled condition.
Fig. 6 is a detail of the holder and stripper.
Fig. 10 is a detail in transverse section showing a slightly modified form of my invention.
Fig. 11 is a view at right angles to Fig. 10 of said detail.
Figures 7, 8, 9, 12, 13:
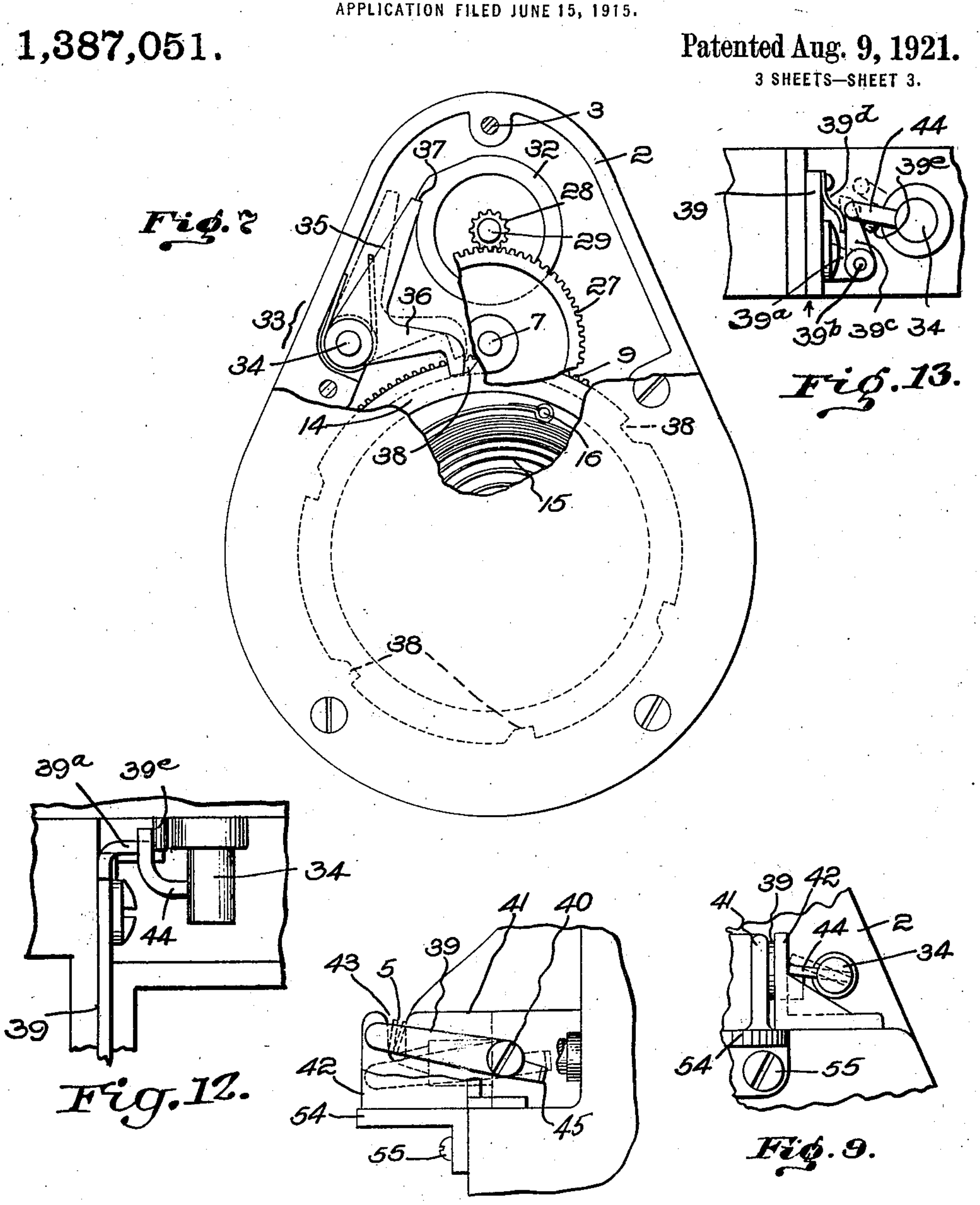
Fig. 7 is a rear view of the implement with a portion of the inclosure broken away to illustrate the driving spring and the control escapement.
Fig. 8 is a detail showing the trigger for releasing the escapement and allowing the implement to fuction.
Fig. 9 is an end elevation of the construction shown in Fig. 8.
Figs. 12 and 13 are details of one form of means permitting the escapement to return immediately to position after actuation of the trigger.

The illustrated implement is provided with knot tying bill and end severing means herein represented at 5 in Figs. 1, 5 and 8, and which may be of any well known type requiring rotation to perform the function of tying a knot. I have herein represented the said tying bill as composed of two jaws constructed and arranged for relative movement and having provisions for shearing the threads or other strands. Inasmuch as these parts are of any suitable construction, a detailed description thereof is unnecessary. The knot tying bill is mounted for rotation in a sleeve 6 itself fixedly mounted within the member 2 of the casing. The said bill projects at its forward end through said sleeve into position to receive the threads. The casing is provided with or receives suitable motor means which may be of any desider or approved type, it being such that the implement is self-contained and readily supported upon the person, even when the user is moving from place to place. While I shall describe a spring motor for the purpose, it is to be clearly understood that I am in no wise to be limited thereto.

I provide suitable means for rotating the tying bill and herein for the purpose I have represented the shaft 7 thereof, one end of which is mounted in the member 1 of the casing, as having fast thereon a pinion 8 meshing with a gear 9, the teeth whereof are, in the disclosed embodiment of the invention, cut on the periphery of a motor spring case 9′. The said spring case has a sleeve-like portion 10 loosely mounted within a sleeve 11 herein shown as integral with the portion 2 of the casing. Mounted within the sleeve 10 is the spindle 12 of a ratchet 13, and between said ratchet and the annular flange 14 of the spring case 9′ is positioned a coiled spring 15, the ends whereof are respectively secured to said spring case and to the ratchet spindle, as indicated at 16, 17. The sleeve 10 of the spring case extends forwardly through the wall 2 of the casing, and the spindle of the ratchet extends through said sleeve 10 and is there provided with a knurled handle or knob 18 fast thereon and by which said spring may be placed under suitable tension. I have herein represented a collar 19 fast on the sleeve 10 between the knurled handle and the wall of the member 2 of the casing. Any suitable means may be provided to wind the spring, and if desired I may for that purpose, as shown in Figs. 10 and 11, provide a strap or other flexible member $19^a$ which the operator may pull from time to time sufficiently to keep the coil spring 15 substantially wound up. For this purpose I preferably provide a ratchet $19^b$ fast upon the outer end of the spindle 12. Loosely mounted upon and surrounding the spindle 12 is a drum $19^c$ having a pawl $19^d$ engaging the ratchet $19^b$, said drum being provided with a spring $19^e$ tending normally to return the drum against the winding operation. The said drum is preferably provided with flanges $19^f$ between which is wound the strap $19^a$, herein shown as having secured to its end a ball $19^g$ permitting ready grasping by the operator.

Any suitable means may be provided to permit the spring to unwind but preventing the ratchet spindle 12 from turning backward during the winding operation. For this purpose I preferably provide a holding pawl 20 mounted for sliding movement in a socket 21 of the member 1 of the casing and having a head or member adapted to engage the teeth of the ratchet and held yieldingly in such relation by a compression spring 23. The spindle 24 of the sliding pawl is at its lower end loosely mounted in the collar 25 tapped into the member 1 of the casing and is provided with a finger piece 26 at the exterior of said member 1 in convenient position to be grasped by the operator, thus permitting said pawl to be withdrawn from the teeth of the ratchet 13. Any suitable escapement means may be provided for the spring motor. In the disclosed form of the invention, fast upon the shaft 7 of the knotter bill is a gear wheel 27 meshing with a pinion 28 fast upon an escapement shaft 29, and whereby the latter is rotated. Said escapement shaft is mounted in suitable bearings 30, 31 in the casing members 1, 2, and has fast thereon an escapement wheel 32, the relative size of the gear 27 and pinion 28 being preferably such that the escapement shaft and its wheel 32 are rotated a number of revolutions, while the knotter shaft and the attached knot tying bill are making a single revolution or rotation.

The escapement wheel 32 is held from turning in any suitable manner. In order to hold the knotter and the escapement wheel from rotation, I preferably provide an escapement lever 33 (Fig. 7) having a pivotal stud 34 projecting through the case and having two arms 35, 36, the former of which extends upwardly viewing Fig. 7 and is adapted to engage a notch or shoulder 37 upon the escapement wheel, and the other of which extends inwardly so as to engage any one of a series of notches 38 upon the periphery of the flange 14 of the spring case 9′.

I have thus far described a tying bill and motor means for rotating the same in an intermittent manner, and in the disclosed embodiment of my invention I have represented spring motor means and escapement means therefor permitting the intermittent actuation of the tying bill through said motor means. I contemplate the provision of means broadly for effecting the release or actuation of the motor means through or by the positioning of the threads or strands by the operator. Obviously such means may be of widely varying form and construction, to the disclosed embodiment of which my invention is in no wise limited.

Herein for that purpose I have represented a releasing trigger 39 (Figs. 4 and 8), which is here shown as pivotally mounted at 40 upon the case. The said trigger is preferably sheathed between two walls or portions of the case, indicated at 41, 42, positioned in close proximity and in parallelism with said trigger, and each having a narrow slot 43 leading down to the upper edge of the trigger and of substantially only sufficient width to permit the insertion of the threads or other strands to be tied. The construction and relation are preferably such as to prevent the accidental actuation of the trigger, which is preferably effectively shielded for this purpose. The said trigger is adapted to be depressed or moved only by having a pair of threads or other strands drawn down firmly on top thereof or one at least of the threads to be knotted. In order to cause the thread impelled movement of the trigger 39 to operate the escapement lever, I may provide any suitable means, and I have herein for that purpose represented the protruding end of the stud 34 of the escapement lever 33 as provided with a bent pin 44, which is engaged and lifted by an outwardly bent end 45 of the said trigger 39 (see Fig. 4).

Figure 2:
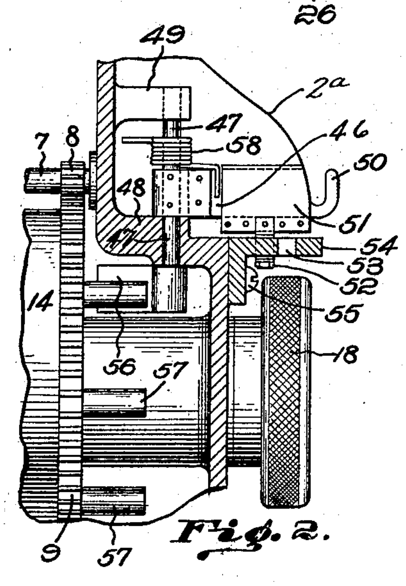
Fig. 2 is a detail, partly in elevation and partly in section on the line 2—2 of Fig. 4, showing the holding and stripping mechanism and a portion of the means for operating the same.
Figure 3:
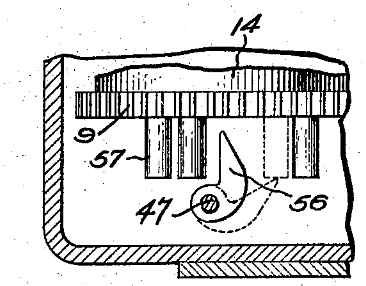
Fig. 3 is a further detail in plan and section showing a portion of the means for operating the stripper mechanism.

I provide any suitable thread holding and stripping means. Herein for that purpose I have represented a combined thread holder and stripper 46 (Fig. 2) fast upon an upright stud 47 located in suitable bearings 48, 49 upon the exterior of the member 2 of the frame. The said thread holder and stripper is provided with a terminal hook-like member 50, and inclosing the same is a suitable sheath or holder 51 having a depending pin or projection 52 engaging a cam slot 53 in a suitable bracket 54 secured to the member 2 of the casing by screw 55. The cam groove 53 is of suitable shape to impart the proper movement to the thread holder and stripper. The stud 47 extends through the wall of the casing 2, and at its lower inner end has fast thereon a dog 56 adapted to be engaged by any one of a series of pins or studs 57, shown as threaded into the wall of the spring case 9′. The said pins 57 are so relatively positioned as to engage the dog 56 at the proper times, and thereby to complete the formation of the knot.

The threads being tied are gripped and held in the stripper by the action of the sheath or holder 51 which is caused to slide out to the position indicated in Fig. 6, and the movement of the stripper is inaugurated by the action of the cam groove 53 engaging the pin or stud 52.

In operation, the implement is preferably supported as described upon the body or about the neck of the operator, the spring 15 being put under tension by turning the knob 18, or in any other suitable manner. A pair of threads to be united is gathered in one hand, laid across the stripper hook 50, the trigger 39 and in line with the knot tying bill 5, the threads being guided into the hook 50 of the stripper by the inclined guide flange $2^a$ on the casing. A depression of the trigger releases the escapement wheel by withdrawing the escapement lever from the notches 37 and 38, thus allowing the knot tying bill to rotate. In the disclosed embodiment of the invention, by the time the escapement wheel 32 has made one revolution, the spring case 9′ has moved far enough so that the arm 36 of the escapement lever 22 is out of engagement with the just active notch 38 of the spring carrying gear 9. Consequently the said arm 36 of the lever 33 cannot again engage the escapement wheel until the next succeeding notch 38 registers with the end of the arm 36 of the lever 33, and in this embodiment of the invention this does not occur until the knot tying bill has made two complete revolutions and all the other parts have functioned in the tying of the knot and stripping it from the knot tying bill.

At the appropriate time during the said two revolutions of the knot tying bill, one of the pins 57 engages the stripper dog 56, causing the stripper arm to commence its movement to the dotted line position shown in Fig. 4, and at the same time the cam slot 33 closes the thread holder 51 on the yarns or threads being tied. The further swinging movement of the stripper 46, 50 draws the complete knot over the nose of the knot tying bill.

After the active pin 57 has passed the stripper dog 56, the stripper is returned to inactive position through the action of the coiled spring 58 herein shown as encircling the stud 47 and having its ends respectively engaging a wall of the casing member 2 and the said stripper.

I have herein represented trigger means operated by pressure of the threads that are to be knotted, but obviously within the broad scope of my invention, I may employ any suitable means, operated by thread pressure, to cause the motor means to function in the tying of a knot. The threads may be brought into operative relation to the tying bill and pressure be applied thereby to the trigger by a single movement.

If desired I may so arrange the trigger and the parts co-acting therewith that upon the depression of the trigger it will release the tying bill, but will not hold the escapement out of operation, but on the contrary will permit the latter substantially immediately to return to position, so that the spring of the motor cannot run down at a single movement of the trigger. While to this end, I may provide any suitable means, I have in Fig. 12 and 13 represented the pivotal stud 34 as having the bent pin 44 laterally extending therefrom and have shown the releasing trigger 39 as provided with a lateral extension $39^a$ to which is pivotally secured at $39^b$ a latch $39^c$ normally outwardly spring pressed by spring $39^d$. Upon the frame is provided a pin $39^e$.

It will be evident from the foregoing description that when the releasing trigger 39 is depressed, the inner end thereof is elevated, thereby moving the latch $39^c$ upwardly against and lifting the bent pin 44, and thereby turning the pivotal stud 34. In such movement of the latch $39^c$ it contacts with the pin $39^e$, and the latter acts to force the latch to the left, viewing Fig. 13, until the upper end of said latch rides from under the bent pin 44, thus permitting the pivotal stud 34 to return to its former position. This prevents all possibility of the spring motor running down at a single movement of the trigger.

It will be evident from the foregoing that by applying thread pressure to the trigger the motor is permitted to function. The severance of the threads with the resulting withdrawal of thread pressure from the trigger permits return movement of the trigger and therefore the thread severing action causes the automatic stopping of the motor after the functioning thereof; that is, it causes the motor to cease functioning.

So far as I am aware, I am the first to operate or release a self-contained motor means of any description by the yarns or threads to be united, and I therefore claim the same broadly.

Having thus described one illustrative embodiment of my invention, I desire it to be understood that although specific terms are employed, they are used in a generic and descriptive sense and not for purposes of limitation, the scope of the invention being set forth in the following claims.

Claims:

1. A thread knotting implement having knotting means, motor means therefor, and trigger means for the motor, said trigger means being adapted to be operated by manual presentation thereto of the threads to be knotted.

2. A thread knotting implement having knotting means, contained motor means therefor, trigger means for the motor, constructed and arranged for actuation by engagement with means extraneous to the person of the user and to the implement, and means for supporting the implement upon the person of the operator thereby leaving both arms and hands free at all times.

3. A thread knotting implement having knotting means, spring motor means for said knotting means, and means operable by pressure of at least one of the threads to be united to release said motor means.

4. A thread knotting implement having a rotary tying bill, a contained motor for rotating said tying bill to tie a knot, and means controlled by manual presentation thereto of at least one of the threads to be tied to control said motor.

5. A thread knotting implement adapted to have threads manually presented thereto for knotting, said implement having a rotary tying bill, a contained motor for rotating the same to tie a knot, and means governed by at least one of the threads to be tied to release the motor.

6. A thread knotting implement adapted to have threads manually presented thereto for knotting, said implement having a rotary tying bill, a contained motor for rotating the same to tie a knot, and means responsive to pressure of at least one of the threads to be united to release the motor.

7. A thread knotting implement having means for readily supporting it upon the person of the operator, thereby leaving both arms and hands free at all times, motor means for operating said knotting means to tie a knot, and means whereby one at least of the threads to be tied governs the operation of said motor means.

8. A thread knotting implement having a tying member, a spring motor for operating the same, an escapement for the motor, and means operable by pressure of at least one of the threads to be united to release the escapement.

9. A thread knotting implement having knotting means, contained motor means therefor, trigger means for the motor constructed and arranged for actuation by engagement with at least one of the thread ends to be tied, and means for supporting the implement upon the person of the operator, thereby leaving both arms and hands free at all times.

10. A thread knotting implement comprising a rotary tying bill, a spring motor therefor, winding means for the motor, a motor escapement, and releasing means for the escapement governed by at least one of the threads to be tied.

11. A thread knotting implement comprising a rotary tying bill, a motor therefor, a motor escapement, and means to effect two rotations of the tying bill at a single release of the escapement thereby to tie the knot.

12. A thread knotting implement having tying means, a motor to operate the same, and means to govern the motor, said means including a member having a slot 43 to permit the application by the user of the implement of the pressure of a thread to be tied to the governing means for the motor thereby to occasion the functioning of the motor and through it of the tying means.

13. A thread knotting implement comprising a suspensible casing, adapted when suspended to leave both hands and arms of the operator free, a spring motor in said casing, a tying bill projecting through the casing and operable by said motor and means controlled by thread pressure to govern said motor.

14. A thread knotting implement comprising a suspensible casing, a spring motor therein, a tying bill projecting through the casing and operable by said motor, an escapement for said motor and means governed by a thread to be tied to control said escapement.

15. A thread knotting implement comprising a suspensible casing, a spring motor therein, a tying bill projecting through the casing and operable by said motor, an escapement for said motor, and means mounted upon the exterior of the casing and adapted and accessible for actuation by a thread to be tied for releasing said escapement.

16. A thread knotting implement comprising a suspensible casing, a spring motor therein, a tying bill projecting through the casing and operable by said motor, an escapement for said motor, and a trigger carried by the casing and operable by pressure of at least one of the threads to be tied to release the escapement.

17. A thread knotting implement comprising a suspensible casing, a spring motor therein, a tying bill projecting through the casing and operable by said motor, thread stripping means also operable by the motor and means governed by at least one of the threads to be tied to control said motor.

18. Thread knotting means comprising a casing, a motor therein, a tying bill projecting through the casing and operable by said motor, an escapement for said motor, a trigger for the escapement, and sheathing means for the trigger having a narrow slit permitting the presentation of threads thereto.

19. A thread knotting implement comprising a casing, a motor therein, a tying bill projecting through the casing and operable by the motor, an escapement for the motor, a trigger for said escapement, and adapted to be operated by pressure thereon of at least one of the threads to be united, and sheathing means for the trigger constructed and arranged to prevent accidental displacement of the trigger.

20. A thread knotting implement comprising a casing, a motor therein, a tying bill projecting through the casing and operable by the motor, an escapement wheel for the motor, an escapement lever controlling said wheel, and a trigger exposed to pressure of at least one of the threads to be united for operating said lever.

21. A thread knotting implement having a motor provided with a rotary member, a tying member operated thereby, a stripper for the tying member, said rotary member having a series of spaced projections, and means extending from said stripper and adapted to be intermittently engaged thereby.

22. A self-contained thread knotting implement having a motor, tying means operated thereby, thread severing means, and means actuated by thread severance to cause the functioning of said motor to cease.

23. A self-contained thread knotting implement having knotting means, a motor therefor, thread severing means, means responsive to thread pressure to put the motor in action, and means responsive to thread severance to cause the functioning of said motor to cease.

24. A self-contained thread knotting implement having a casing provided with a motor, knotting means and thread severing means operated thereby, means responsive to thread pressure to cause the knotting means to function and means responsive to thread severance to cause the motor to cease functioning.

25. A self-contained thread knotting implement having a casing provided with a spring motor, knotting means and severing means operated thereby, means responsive to thread pressure to cause the knotting means to function, and means responsive to thread severance to stop the functioning of the motor.

26. A thread knotting implement having thread knotting means, a self-contained motor to operate the same, an escapement for said motor and means for releasing said escapement by pressure of at least one of the threads to be united.

27. A thread knotting implement having thread knotting means, a motor for operating said knotting means, an escapement for said motor, and means whereby the functioning of said escapement is governed by thread pressure, and the subsequent thread severance by the implement.

28. A thread knotting implement having a shaft provided with a tying-bill, a spring motor having a shaft, and an escapement provided with a shaft, said shafts being in parallelism, and operating connections between said shafts.

29. A thread knotting implement having a casing containing a spring motor and its shaft, a tying bill and its shaft, and an escapement and its shaft, operative connections between said shafts, and means whereby movement of said escapement is controlled by thread pressure.

30. A thread knotting implement having thread knotting means, a self-contained motor for operating said means, an escapement for said motor, a releasing trigger for said escapement, and means whereby said releasing trigger is operated by pressure of at least one of the threads to be united.

31. A thread knotting implement having thread knotting means, a spring motor having a casing and co-acting with said knotting means, an escapement to control said spring motor and an escapement lever engaging said escapement and also engaging said spring motor casing.

32. A thread knotting implement having thread knotting means, a spring motor having a casing and co-acting with said knotting means, an escapement to control said spring motor, an escapement lever engaging said escapement and also engaging said spring motor casing, and means whereby said escapement lever is controlled by thread pressure.

33. A thread knotting implement having a rotary tying bill, a motor controlling the same, a trigger controlling the motor and a stripper, said parts being relatively positioned to permit a pair of threads to be laid across said tying bill, trigger and stripper.

34. A thread knotting implement having a knot tying bill 5, a self-contained motor therefor, an escapement for said motor, a trigger 39 controlling said escapement, and a stripper 60, said tying bill, trigger and stripper being relatively positioned to permit a pair of threads to be laid there-across.

35. A thread knotting implement having a knot tying bill, a spring motor to rotate the same and an escapement for said motor, controlled by pressure of the threads to be tied, and coöperating means to effect two revolutions of the tying bill upon release by the spring motor.

36. A thread knotting implement having a rotary tying bill, a motor to operate the same, an escapement for said motor controlled by pressure of the threads to be tied, and a thread stripper relatively connected to and operated by said motor.

37. A thread knotting implement having a rotary tying bill, a spring motor to operate the same, an escapement 32 for said motor, an escapement controlling device 33, and trigger means 39 responsive to pressure of at least one of the threads to be tied by said implement for moving said escapement controlling device.

38. A thread knotting implement having a rotary tying bill, a spring motor to operate the same, an escapement 32 for said motor, an escapement controlling device 33, and trigger means 39 for moving said device, said implement having a slot or slots 43 to permit the application of thread pressure to said trigger.

39. Thread knotting means comprising a casing, a motor therein, a tying bill projecting through the casing and operable by said motor, governing means for said motor, controlling means for said governing means, and sheathing means for the controlling means having a narrow slit permitting the presentation of threads to said controlling means.

40. A thread knotting implement having knotting means, contained motor means to operate said knotting means to tie a knot, means to cause the functioning of said motor means by means distinct from said implement and the person, arms or hands of the operator, and means for supporting the implement upon the person of the operator, thereby leaving both arms and hands free at all times.

41. A readily portable, thread knotting implement adapted to be carried by the operator from point to point of use upon spooler or other machines, said implement having knotting means, motor means therefor, and means to govern the functioning of said motor, said latter means being adapted to be operated by pressure of a thread to be knotted to another.

42. A thread knotting implement having a tying member and a stripper, a contained motor operatively associated with said tying member and said stripper, to effect the tying of the knot and the stripping thereof, means to support the implement on the person of the operator leaving both arms and hands free at all times, and means to govern said motor by a thread to be tied.

43. A thread knotting implement having a tying member and a stripper, a contained motor operatively associated with said tying member and said stripper, to effect the tying of the knot and the stripping thereof, means to support the implement on the person of the operator leaving both arms and hands free at all times, and means for governing said motor by pressure of a thread to be tied by said implement.

44. A thread knotting implement having a tying member, a contained motor operatively associated with said tying member, means to support the implement on the person of the operator leaving both arms and hands free at all times, and means to govern said motor and including a part having a slot 43 to permit the application of thread pressure to the said governing means.

45. A knot tying implement having means to support it upon the person and also having knotting means, motor means therefor, and trigger means for said motor, said trigger means being adapted to be operated by the threads to be knotted.

46. A thread knotting implement having means for readily attaching it to the person of the operator, thereby leaving both arms and hands free at all times, and whereby the operator's hands may be employed to present to the implement the thread ends to be tied, said implement having knot tying means carried thereby, and means whereby pressure of at least one of the thread ends to be tied occasions the operation of one of the said knot tying means to tie a knot.

In testimony whereof, I have signed my name to this specification, in the presence of two subscribing witnesses.

EDGAR F. HATHAWAY.

Witnesses:

MAY H. LOWRY,

ROBERT H. KAMMLER.